United States Patent

[11] 3,578,209

| [72] | Inventor | James K. Fraser |
| | | 1356 Clairmont Road, Decatur, Ga. 30033 |
| [21] | Appl. No. | 782,539 |
| [22] | Filed | Dec. 10, 1968 |
| [45] | Patented | May 11, 1971 |

[54] TIMED FEEDING MECHANISM
2 Claims, 4 Drawing Figs.

[52] U.S. Cl.................................................. 222/23,
222/70, 222/307, 222/363, 222/368
[51] Int. Cl.................................................... B67d 5/06
[50] Field of Search........................................... 222/70,
282, 363, 307, 308, 368

[56] References Cited
UNITED STATES PATENTS

| 714,026 | 11/1902 | Perkins.................... | 222/308X |
| 795,676 | 7/1905 | Ammen..................... | 222/308 |
| 2,081,544 | 5/1937 | Krivig....................... | 222/308X |
| 2,282,110 | 5/1942 | Angell....................... | 222/308 |
| 2,779,502 | 1/1957 | Ackerman, Jr. ........... | 222/308X |
| 2,847,066 | 8/1958 | Kleiber et al. ............ | 222/70X |
| 3,029,002 | 4/1962 | Gregoire................... | 222/307 |
| 3,043,479 | 7/1962 | Gaukstern................. | 222/70X |
| 3,140,018 | 7/1964 | Miller....................... | 222/307X |
| 3,169,668 | 2/1965 | Ziegler..................... | 222/307X |

FOREIGN PATENTS

| 505,831 | 10/1932 | Australia.................... | 222/308 |

Primary Examiner—Joseph R. Leclair
Assistant Examiner—Steven E. Lipman
Attorney—Jones and Thomas ABSTRACT: A timed feeding mechanism suitable for dispensing food or other granular material to fish or other pets or larger animals at predetermined time intervals and in prescribed quantities, comprising a housing defining an inlet opening and an outlet opening, a receptacle movable between the inlet and outlet openings, a hopper communicating with the inlet opening of the housing for supplying the granular material to the housing, and a timing mechanism for moving the receptacle back and forth between the inlet and outlet openings of the housing to dispense the granular material from the hopper through the housing.

Patented May 11, 1971
3,578,209
2 Sheets-Sheet 1
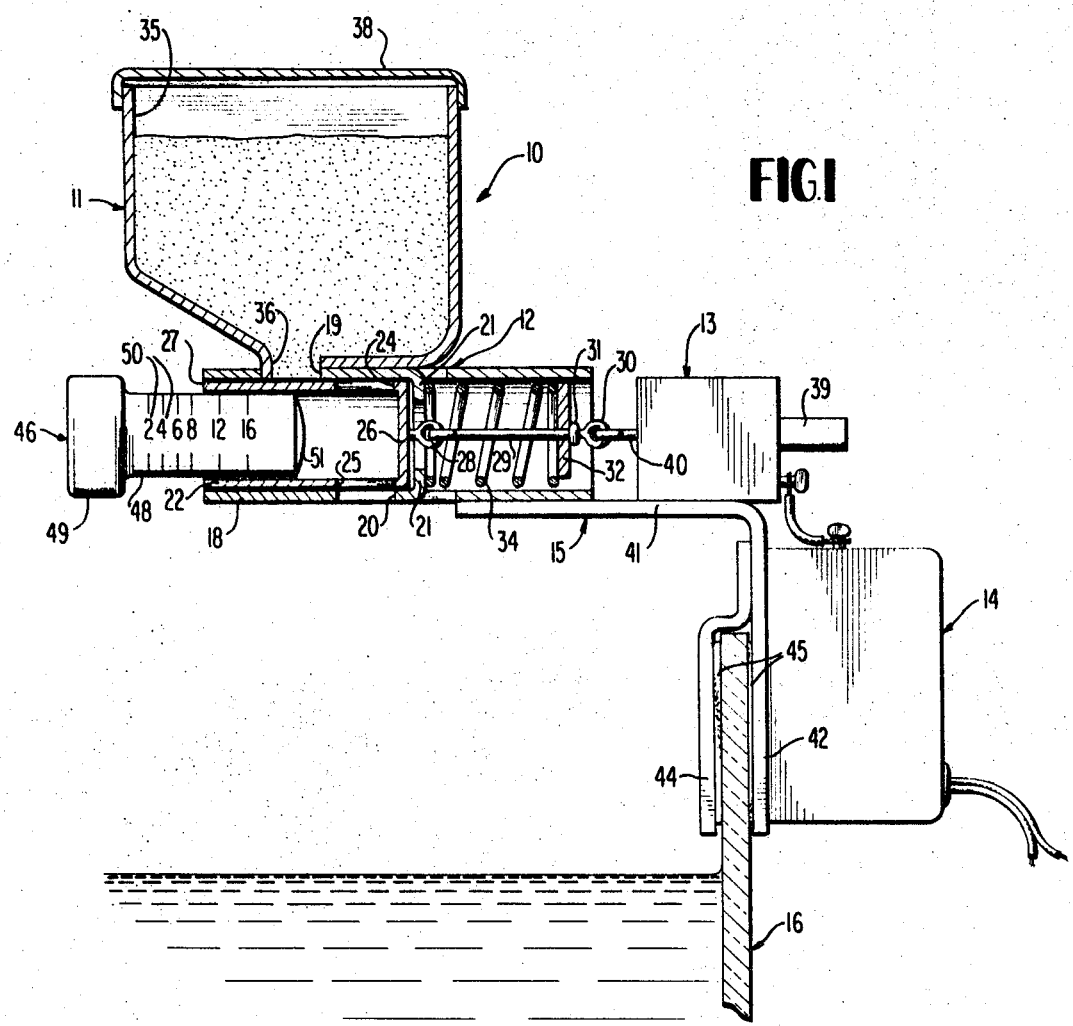
FIG.1
FIG 4
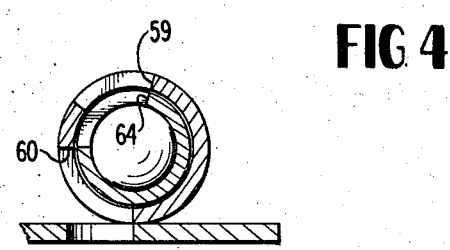
INVENTOR
JAMES K. FRASER
BY *Jones & Thomas*
ATTORNEYS Patented May 11, 1971

INVENTOR
JAMES K. FRASER

BY Jones & Thomas

ATTORNEYS

TIMED FEEDING MECHANISM

BACKGROUND OF THE INVENTION

Captive fish, animals and fowl, must be fed a proper volume of food at spaced time intervals. As in the feeding of goldfish, the responsibility of the pet shop operator or the individual aquarium owner to feed the fish is sometimes onerous, when the operator or owner is not available to feed the fish when on vacations, or the like.

While various automatic feeding devices have been developed for feeding goldfish, and other pets, most of the devices have been unsatisfactory in that they are limited to a certain number of feedings, the feeding function is unreliable, the volume of the food fed is unreliable, and the devices developed are suitable for one or a standard number of fish and cannot be varied when different numbers of fish are to be fed from time to time. Furthermore, the food to be fed frequently becomes moist and unsuitable for dispensing to the fish, and occasionally becomes mildewed and spoiled.

SUMMARY OF THE INVENTION

Briefly described, the present invention comprises a timed feeding mechanism suitable for feeding granular substances to fish, or the like. The mechanism is adjustable to dispense varying amounts of the substance, so that it can be utilized to feed one or several fish. The structure is formed so that the granular food is maintained in a dry condition until dispensed to the fish and the feeding action of the mechanism is a positive one in that an accurate measurement of the granular food is fed on each cycle.

Thus, it is an object of this invention to provide a feeding mechanism for feeding fish or other pets at intervals of time.

Another object of this invention is to provide a feeding mechanism for dispensing a granular substance from a hopper, and means for varying the volume of the feeding mechanism so as to dispense a greater or a lesser volume of the substance.

Another object of this invention is to provide the feeding mechanism which is adjustable to dispense varying quantities of granular feed to an aquarium, or the like.

Another object of this invention is to provide a feeding mechanism operable at time intervals which is inexpensive to manufacture, convenient to clean and fill, and which operates reliably.

Other objects, features, and advantages of the present invention will become apparent upon reading the following specification, when taken in conjunction with the accompanying drawing.

BRIEF DESCRIPTION OF THE DRAWING

FIG. 1 is a side elevational view, with parts in section, of the feeding mechanism.

FIG. 4 is an end cross-sectional view of the housing and receptacle of FIG. 2, taken along lines 4—4 of FIG. 2.

DESCRIPTION OF THE PREFERRED EMBODIMENTS

Figure 2:
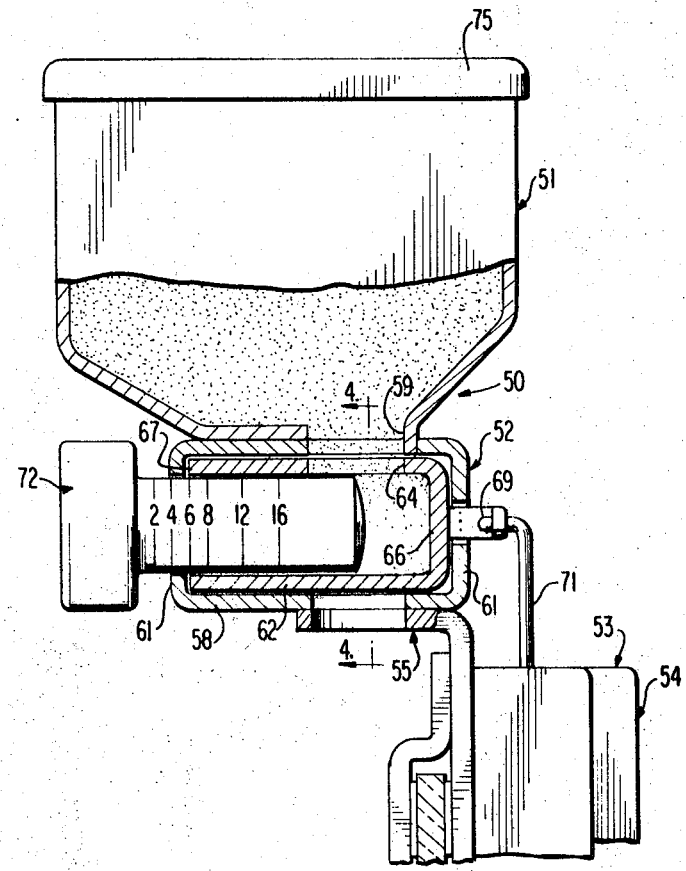
FIG. 2 is a side elevational view, with parts in section, of a modified form of the invention.

Referring now in more detail to the drawing, in which like numerals indicate like parts throughout the several views, FIG. 1 shows feeding mechanism 10 which includes hopper 11, dispenser 12, solenoid 13, timer 14, and support bracket 15. Support bracket 15 suspends feeding mechanism 10 from the edge of an aquarium 16.

Dispenser 12 includes tubular housing 18 which is open ended and defines inlet opening 19 and outlet opening 20. Inlet opening 19 is spaced along the longitudinal axis of housing 18 away from outlet opening 20. A pair of restraining tabs 21 are struck from the sidewalls of housing 18 and project inwardly of the housing.

Dispensing receptacle 22 is also of tubular configuration and telescopically received within housing 18. Receptacle 22 defines inlet opening 24 and outlet opening 25 on opposite sides of its sidewall. Inlet opening 24 and outlet opening 25 are aligned with each other. Receptacle 22 is closed at one end by endwall 26, and its other end remains open. Boss 28 is connected to the outside of endwall 26, and connecting stem 29 is connected to boss 28. Connecting stem 29 terminates in an eye 30 and collar 31. Apertured disc 32 is inserted over connecting stem 29 and engages collar 31. Compression spring 34 is positioned within housing 18, and one of its ends engages restraining tabs 21 of housing 18, while its other end engages apertured disc 32. With this arrangement, compression spring 34 functions to urge apertured disc 32, connecting stem 29, and receptacle 22 to the right (FIG. 1) against restraining tabs 21. When receptacle 22 is in this position, its outlet opening 25 is in registration with outlet opening 20 of housing 18, while its inlet opening 24 is out of registration with inlet opening 19 of housing 18. When receptacle 22 is moved to the left (FIG. 1) against the bias of compression spring 34, inlet opening 24 will be in registration with inlet opening 19 of housing 18 while outlet opening 25 will be out of registration with outlet opening 20 of housing 18.

Hopper 11 defines an open upper end 35 and converges at its lower portion to define smaller lower opening 36. Lower opening 36 communicates with inlet opening 19 of housing 18. Hopper 11 is filled with a granular feed suitable for feeding fish, or the like, and the open upper end 35 of hopper 11 is usually closed by a polyethylene film or aluminum foil 38.

Solenoid 13 includes armature 39 which is movable into the housing of the solenoid and toward dispenser housing 18. Connecting arm 40 is connected to the eye 30 of connecting stem 29 of receptacle 22. When the solenoid is actuated, its armature 39 will move into the solenoid housing, and connecting arm 40 will urge connecting stem 29 and receptacle 22 to the left (FIG. 1) against the bias of compression spring 34, and inlet opening 24 of receptacle 22 will register with inlet opening 19 of housing 18, while outlet opening 25 of receptacle 22 will be moved out of registration with outlet opening 20 of housing 18.

Solenoid 13 is connected to timer 14. Timer 14 is of conventional construction and can be of the type which functions to actuate solenoid 13 at spaced time intervals, such as at 24-hour or 12-hour intervals.

Support bracket 15 is generally L-shaped, and its upper horizontal leg 41 supports hopper 11, dispenser 12, and solenoid 13, while its lower vertical leg 42 supports timer 14. Clamp 44 is connected to vertical leg 42, and resilient pads 45 are attached to the facing surfaces of clamp 44 and vertical leg 42. Vertical leg 42 and clamp 44 are inserted over the upper edge of aquarium 16, to suspend feeding mechanism 10 in the position as shown in FIG. 1.

Receptacle 22 is open at its end 27 away from endwall 26. Adjusting plug 46 includes shank 48 and enlarged head 49. Shank 48 is approximately the same diameter as the internal surface of receptacle 22, and is insertable into the receptacle through the open end 27. Shank 48 includes indicia 50 along its length which corresponds to the space remaining between the end 51 of shank 48 and endwall 26 of receptacle 22. The indicia of shank 48 generally corresponds to the number of fish to be fed by feeding mechanism 10. When adjusting plug 46 is moved into receptacle 22, the volume remaining in receptacle 22 is decreased and the amount of granular feed which can be dispensed on each cycle of feeding mechanism 10 is decreased. The number exposed adjacent the open end 27 of receptacle 22 generally corresponds to the number of fish which feeding mechanism 10 is then suitable to feed. Of course, when adjusting plug 46 is withdrawn from receptacle 22 so that a larger number is exposed at the open end 27 of receptacle 22, the volume of receptacle 22 is increased and the amount of food it is capable of dispensing generally corresponds to the number of fish indicated on the surface of shank 48.

When solenoid 13 is not actuated, receptacle 22 communicates through its outlet opening 25 and the outlet opening 20 of housing 18 with the aquarium. Any granular substance present within receptacle 22 will be inclined to fall through the aligned outlet openings into aquarium 16, and the internal portion of receptacle 22 will be exposed to the atmosphere. In the meantime, hopper 11 will be closed from the atmosphere by its cover 38 and since its outlet opening 19 does not communicate with dispenser 12. Thus, the granular feed remaining in hopper 11 will be closed from the atmosphere and any moisture or other contaminants, and maintained in a dry, pure condition, When solenoid 13 is energized by timer 14, receptacle 22 will be moved to the left (FIG. 1), so that inlet openings 19 and 24 register while outlet openings 20 and 25 are moved out of registration with each other, and a portion of the feed within hopper 11 will fall into receptacle 22. When solenoid 13 is deenergized by timer 14, compression spring 34 functions to vigorously urge receptacle 22 to the right (FIG. 1) until it engages restraining tabs 21, whereupon inlet openings 19 and 24 are no longer in registration, and outlet openings 20 and 25 register. The abrupt movement of receptacle 22 functions to jar the feed deposited from hopper 11 into receptacle 22 through the aligned outlet openings and into the aquarium. Since outlet opening 25 of receptacle 22 is positioned adjacent endwall 26, the abrupt deceleration of receptacle 22 as it engages restraining tabs 21 functions to urge all of the feed within receptacle 22 through outlet opening 25, and virtually no feed tends to remain within receptacle 22. Thus, a positive feeding function is attained on each cycle of feeding mechanism 10.

Figure 3:
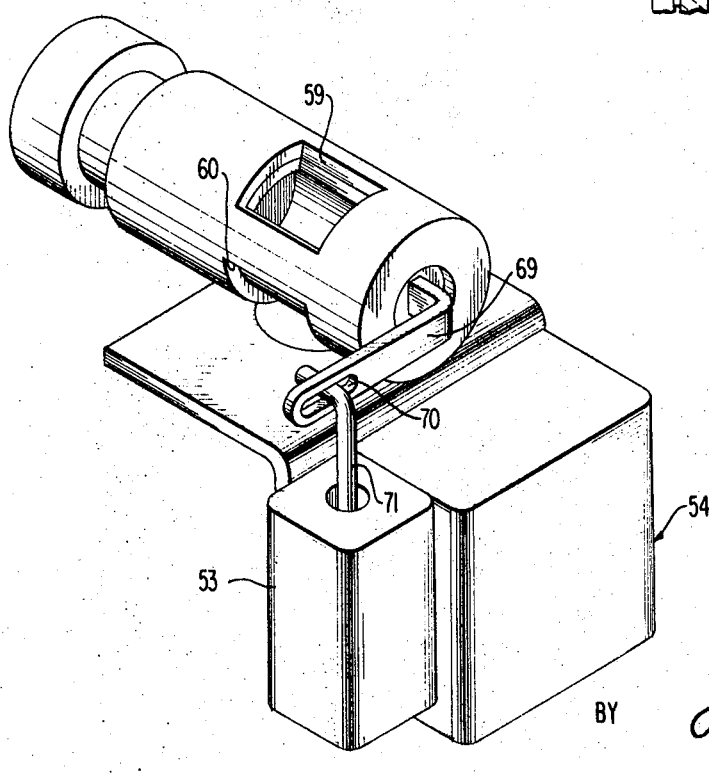
FIG. 3 is a perspective view of the invention shown in FIG. 2, but with the hopper removed for clarity.

As is shown in FIG. 2, 3, and 4, an alternate form of the invention is disclosed. Feeding mechanism 50 includes hopper 51, dispenser 52, solenoid 53, and timer 54. Bracket 55 is similar to bracket 15 and functions to support the various elements from the edge of the aquarium. Dispenser housing 58 is cylindrical and defines inlet opening 59 and outlet opening 60. Restraining tabs 61 extend inwardly at each end of housing 58.

Feed receptacle 62 is also of cylindrical configuration and is rotatably positioned within housing 58. Receptacle 62 defines arcuate transfer opening 64 in its sidewall, endwall 66, and its opposite end 67 remains open. Lever arm 69 is connected to the outer surface of endwall 66. Lever arm 69 is L-shaped, and terminates in slot or eye 70. Connecting arm 71 of solenoid 53 engages eye 70 of lever arm 69, and the armature (not shown) of solenoid 53 functions to move connecting arm 71 and lever arm 69 in an upward, clockwise (FIG. 3) direction, when solenoid 53 is energized by timer 54. When the solenoid is deenergized, the weight of the armature, connecting arm 71, and lever 69 is such as to move lever arm 69 in a downward, counterclockwise direction.

Adjusting plug 72 extends through the open end 67 of receptacle 62. Adjusting plug 72 is similar to the adjusting plug 46 of FIG. 1.

When timer 54 energizes solenoid 53, connecting arm 71 of solenoid 53 is urged in an upward direction, which rotates receptacle 62 within housing 58 so that the opening 64 of receptacle 62 registers with inlet opening 59 of housing 58. The feed and hopper 51 then falls into receptacle 62, and occupies the space between the end of adjusting plug 72 and endwall 66. When solenoid 53 is deenergized the weight of its armature, connecting arm 71 and lever 69 is such as to rotate receptacle 62 in a counterclockwise direction (FIG. 3), so that the opening 64 of receptacle 62 is directed downwardly and into registration with outlet opening 60 of housing 58. With receptacle 62 in this attitude, the granular feed deposited from hopper 51 into receptacle 62 will be free to fall through outlet opening 60 of housing 58 into the aquarium.

Adjusting plug 72 functions in a manner similar to adjusting plug 46 of FIG. 1 in that the numbers exposed at the end of receptacle 62 are indicative of the number of fish which feeding mechanism 50 is set to feed. Furthermore, adjusting plug 72 can be moved inwardly or outwardly of receptacle 62 to accommodate more or fewer fish.

Hopper 51 is normally maintained completely out of communication with the atmosphere by its covering 75 and by the feature of receptacle 62 in that it closes inlet opening 59 of housing 58 when solenoid 53 is deenergized. Thus, as with the invention shown in FIG. 1, the feed within hopper 51 is maintained in a state so that it will not become moist and will not mildew or become otherwise contaminated. Furthermore, the positive action of solenoid 53 and receptacle 62 is such that the desired measurement of feed will be reliably dispensed upon each cycle of feed mechanism 50.

The components of the feeding mechanisms can be fabricated of various materials, including metal or plastic. Furthermore, the adjusting plugs can be arranged to frictionally engage the internal surface of the dispensers or the dispensers and the adjusting plugs can be threaded to assure a positive setting.

While all of the embodiments of the invention have been set forth as suitable for feeding fish, it should be obvious that various other uses can be made of the invention. Also, the invention can be increased in size to accommodate larger pets or higher volume dispensing functions. While a solenoid and electrical timing apparatus has been disclosed, it should be apparent that mechanical timing apparatus can be utilized, and mechanical receptacle actuating mechanism can be utilized.

While this invention has been described in detail with particular reference to preferred embodiments thereof, it will be understood that variations and modifications can be effected within the spirit and scope of the invention as described hereinbefore and as defined in the appended claims.

I claim:

1. Apparatus for intermittently dispensing granular material in measured quantities to feed fish or the like comprising a hopper, a housing having an open end, a material inlet opening defined in the upper portion of said housing and communicating with said hopper and a material outlet opening defined in the lower portion of said housing and laterally spaced away from the open end of said housing from below said inlet opening, a dispensing receptacle slidably received in said housing through the open end of said housing, said dispensing receptacle comprising an open end positioned adjacent the open end of said housing, a material inlet opening in the upper portion of said dispensing receptacle and movable with the movement of said dispensing receptacle toward the open end of said housing into registration with the material inlet opening of said housing and movable with the movement of said dispensing receptacle away from the open end of said housing out of registration with the material inlet opening of said housing, and a material outlet opening in the lower portion of said dispensing receptacle movable with the movement of said dispensing receptacle into registration with the material outlet opening of said housing when the material inlet opening of said dispensing receptacle is out of registration with the material inlet opening of said housing and movable with the movement of said dispensing receptacle out of registration with the material outlet opening of said housing when the material inlet opening of said dispensing receptacle is in registration with the material inlet opening of said housing, a plug member having a shank insertable into the open end of said dispensing receptacle, a series of spaced indicia imposed on said shank for indicating the depth of insertion of said plug into said dispensing receptacle, spring means connected to the end of said dispensing receptacle remote from its open end and arranged to urge said dispensing receptacle into said housing, power means for urging said dispensing receptacle against the bias of said spring means, and timing apparatus for intermittently energizing said power means.

2. The apparatus of claim 1 and wherein said power means comprises a solenoid, and said spring means comprises a compression spring.